Figure 1:
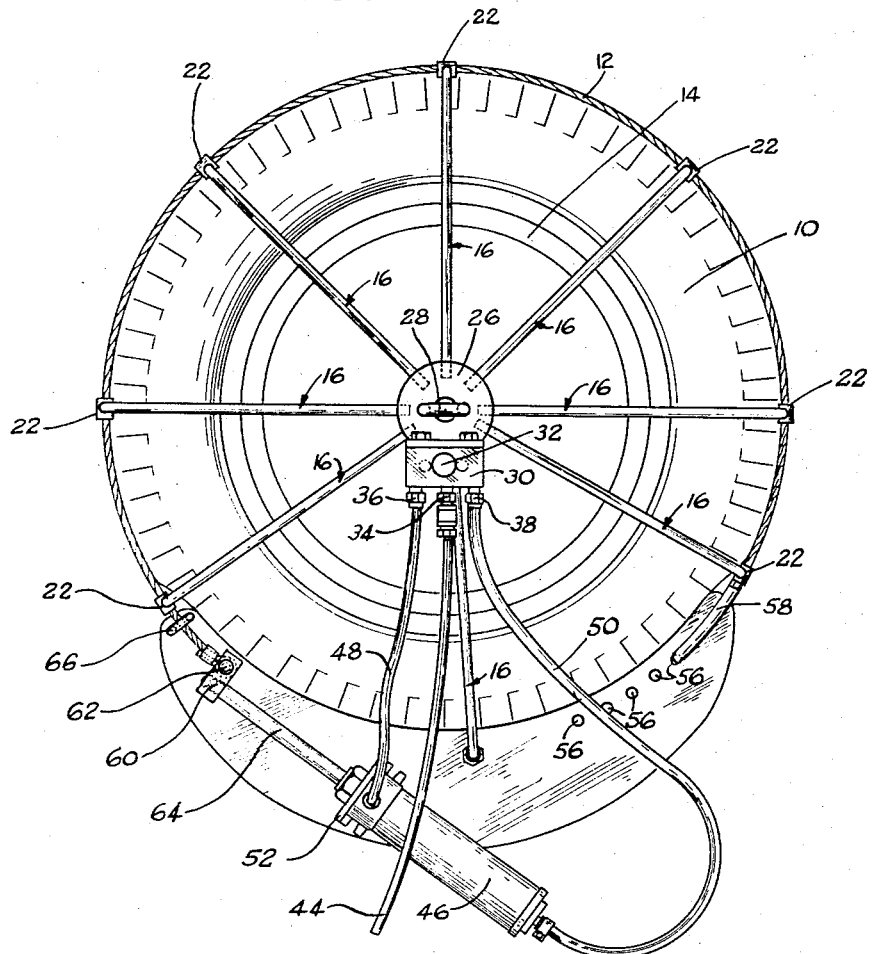

Sept. 26, 1967    B. PLUNK    3,343,583
TIRE MOUNTING TOOL
Filed May 19, 1965

INVENTOR.
Bervis Plunk
BY
Philpitt, Steininger & Priddy

United States Patent Office 3,343,583
Patented Sept. 26, 1967

3,343,583
TIRE MOUNTING TOOL
Bervia Plunk, 6105 Morningside, Dallas, Tex. 75214
Filed May 19, 1965, Ser. No. 456,913
8 Claims. (Cl. 157—1.21)

The present invention relates to a device for mounting tires. In a more specific aspect, the present invention relates to a device for pressing the bead of a tire against a wheel rim in order to facilitate the inflation of the tire.

In the art of mounting tires on a vehicle wheel, the advent of the tubeless tire has introduced numerous problems. These problems have made it impossible for the individual to mount a tire on a wheel and in many cases such mounting cannot be properly and efficiently performed in many garages and service stations. In the mounting of a tubeless tire it is necessary that the tire have its periphery compressed so that the beads of the tire will be spread and the bottom bead forced downwardly against the bottom rim of a horizontally-disposed wheel and the top bead pressed upwardly against the top rim of the wheel. To do this a wide variety of devices have been proposed. The simplest of such devices is of course a flexible band through which a stick or some other object is twisted in tourniquet fashion. This of course is an extremely inefficient method of mounting a tire, but, in many, many instances this is the only means available to the operator. The tourniquet-type mounting operation has a number of disadvantages in that it requires the operator to be in several different places at the same time, that is, he should be manually applying pressure to the tourniquet or other pressuring device while at the same time watching the bead, guiding the bead, if necessary, and applying air to the interior of the tire to form the seal between the bead and the rim. Some of the more sophisticated devices for compressing a tubeless tire involve the attachment of a lever to a wide band of adjustable dimension. This wide band compresses an equally wide vertical portion or transverse portion of the periphery of the tire and thus it takes more compressional force and a greater reduction in the diameter of the band in order to cause the beads to spread against the rim. In order to free the operator, to some extent, eliminate the necessity of manual application of pressure, and speed up the operation, it has also been proposed that hydraulic mechanisms be added to the band-type mounting devices. As a matter of fact, the fact that hydraulic equipment requires at least a hydraulic cylinder to be mounted on the compressional band unit, adds the further problem that the weight of the hydraulic cylinder or the hydraulic equipment makes it even more difficult to position the compressional band about the tire.

It is therefore an object of the present invention to provide an improved tire mounting device.

Another and further object of the present invention is to provide an improved device for spreading the bead of a tire against a wheel rim.

A further object of the present invention is to provide an improved device for spreading the bead of a tire against a wheel rim wherein improved compressional efficiency is obtained.

Another object of the present invention is to provide an improved device for spreading the bead of a tire against the rim of a wheel wherein a thin cable applies the pressure to the exterior of the tire.

A still further object of the present invention is to provide an improved device for spreading the bead of a tire against the rim of a wheel wherein a thin cable applies pressure to the exterior of the tire and thereby requires that the compressional reduction in diameter be less than is normally required with conventional tools.

Still another object of the present invention is to provide an improved device for spreading the bead of a tire against the rim of a wheel in which a cable, having inadequate structural cross section to be self-supporting and retain its circular configuration, is utilized and is supported in a generally circular configuration permitting its ready placement about the periphery of a tire.

Yet another object of the present invention is to provide an improved device for spreading the bead of a tire against the rim of a wheel which is readily supported above the operating area and can be lowered onto the tire so as to free the operator to actually apply pressure to the device and to apply air to the interior of a tire.

Still another object of the present invention is to provide an improved device for spreading the bead of a tire against the rim of a wheel in which the device can be suspended above the work area and the device can be lowered into position over the tire and pressure to compress the tire applied in a single movement with one hand.

A yet further object of the present invention is to provide an improved apparatus for spreading the bead of a tire against the rim of a wheel wherein pressure is applied to the exterior of the tire by a hydraulically-actuated compressional cable.

A further object of the present invention is to provide an improved device for spreading the bead of a tire against the rim of a wheel wherein an air-operated hydraulic mechanism applies compressional force to a thin cable about the periphery of a tire.

Another and further object of the present invention is to provide an improved device for spreading the bead of a tire against the rim of a wheel wherein air pressure can be applied to a hydraulic mechanism by the operation of a conveniently located lever.

Still another object of the present invention is to provide a device for spreading the bead of a tire against the rim of a wheel wherein a hydraulic mechanism applies compressional force to the tire and it is unnecessary for the operator to support the weight of the hydraulic mechanism during application and use of the device.

A still further object of the present invention is to provide an improved device for spreading the bead of a tire against the rim of a wheel wherein a compressional means which slightly distorts the tire is provided.

Another and further object of the present invention is to provide an improved device for spreading the bead of a tire against the rim of a wheel wherein a compressional means is provided which distorts a portion of the tire thereby facilitating passage of the bead of the tire over the area of the wheel containing the air valve.

Still another object of the present invention is to provide an improved device for spreading the bead of a tire against the rim of a wheel wherein the device may be preliminarily adjusted to fit different sizes of tires so that the actual compressional force need not be excessive.

Figure 2:
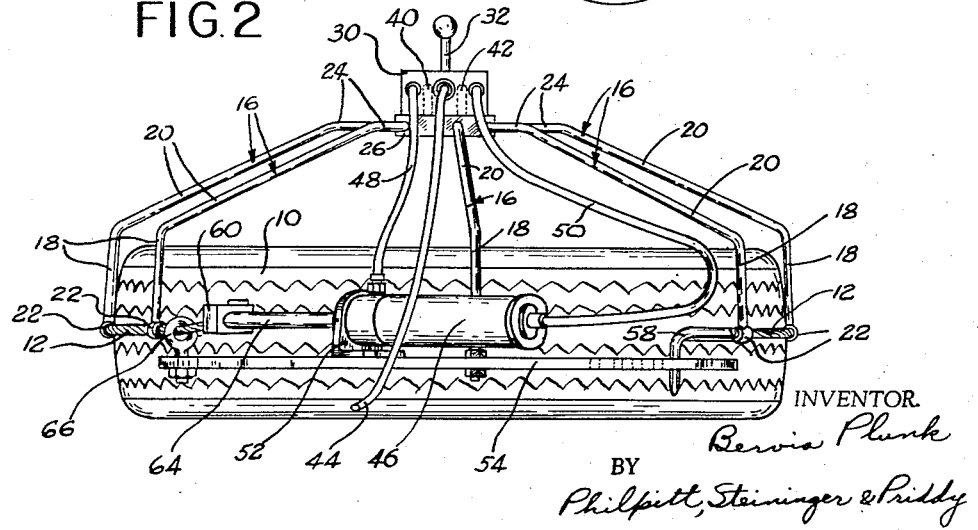

These and other objects of the present invention will be apparent from the following detailed description when read in conjunction with the drawings, wherein:

FIGURE 1 is a plan view of the device of the present invention showing the tool mounted on a tire; and FIGURE 2 is a side elevational view of the device shown in FIGURE 1.

In accordance with the drawings, the numeral 10 designates a tire of the tubeless type. Although no wheel is shown, in the drawings, it is of course obvious that the wheel would be horizontally-disposed in the center of the tire. Surrounding the major portion of the tire 10 is flexible cable 12. Cable 12 could be any of a wide variety of structures including a wire cable, a strong rope, such as a nylon rope, or a solid spring steel rod. Preferably, however, the cable 12 is a wide cable and is thin enough that when pressure is applied the compression takes place only at a very narrow or point contact on the vertical section of the tire. By way of specific example, a ⁹⁄₁₆" cable 6 to 7 feet long has been found suitable. This point, or narrow line of compression, permits the spreading of the tire bead a substantial amount with only a very slight tensioning or reduction in the diameter of the cable. The tire bead is indicated in the drawing by the numeral 14. Since cable 12 is flexible and is of a character such that it will not retain its circular, generally-horizontal configuration without outside support, the cable is supported at points about its entire periphery. This is accomplished by providing the spring steel rods 16. These rods turn generally downwardly and terminate in vertical sections 18 of sufficient height to accommodate any of the conventional size tires without the top of the tire touching the angular portions 20 of the support rods when the cable is pulled inwardly and the bead of the tire reaches its uppermost position. The rods 16 are preferably made of spring steel or other resilient material so that when the cable 12 is pulled to a narrower diameter, the rods 16 may bend inwardly in conformance with the dimension of the cable 12. Cold rolled steel rod stock ⁹⁄₁₆ to ¼" in diameter has been found useful in actual devices. Rods 16 are slideably attached to cable 12 by means of sleeves 22 which are adapted to slide on cable 12. Sleeves 22 are welded or otherwise affixed to rods 16. The uppermost, generally-horizontally-disposed sections 24 of rod 16 are brought together at the center of the device and frictionally slip into holes drilled in support disc 26. Support disc 26 is preferably made of a reasonably strong material for reasons which will be pointed out hereafter. Attached to disc 26, either by welding or by a nut or other appropriate means, is a hook means 28. Hook means 28 serves an extremely important and useful purpose in the present device. Specifically, hook means 28 permits the entire device to be suspended above the work area where tires are being changed, out of the way of the operator and in a position such that it can be rapidly placed over the tire. Hook means 28 is shown as a conventional eye-bolt. As is the usual custom where devices are suspended above a work area in a garage or filling station, the hook means 28 would be attached to an appropriate cable or rope leading from a spring loaded reel or other device at its upper end so that it will be held in a retracted, elevated position out of the way of the operator but can be brought downwardly to its lowermost position and placed over the tire by simply overcoming the spring tension. When the operation has been completed and the cable is released from around the tire, the device will be released and automatically returned to its elevated position. This suspension relieves the operator of many and varied duties. It permits the operator to easily place the device over the tire without holding or supporting the weight of the device. In addition, the suspension, together with the support of the compression cable by rods 26, results in a cap-type structure which can be very readily pushed down over the tire with one hand and without the problem of the cable sagging or getting out of position. Also mounted on support disc 26 by welding, bolting or other appropriate means is a hydraulic valve 30. As shown, hydraulic valve 30 is a four-way valve adapted for use with a double-acting hydraulic cylinder. In valve 30, the valve has a neutral or closed position, two "on" positions, and an exhaust position. The operation of the valve is accomplished by means of valve handle 32. Valve handle 32 may be in any given position, but it is conveniently in an upright position, as shown, since this permits the operator to lower the device over the tire and manipulate the valve handle in one movement and with one hand. Entering valve 32 is a quick-connect coupling 34 to permit the introduction of hydraulic fluid and coming out of the valve is a hydraulic fluid supply coupling 36 and a similar supply coupling 38. Associated with supply coupling 36 is an exhaust outlet 40 and associated with coupling 38 is an exhaust 42. Accordingly, when the valve is moved to supply hydraulic fluid through coupling 36, exhaust 42 associated with the coupling 38 will be opened to permit any fluid on the opposite end of the hydraulic cylinder to be discharged. Similarly, when the valve is in a position where fluid is supplied to coupling 38 (the passage to coupling 36 being closed) exhaust 42 will be closed and exhaust 40 will be open, thereby releasing the pressure from the side of the cylinder supplied by coupling 36. While the inlet coupling 34 has been shown as a quick-connect coupling, it is preferred that this be a permanent, or semi-permanent, type of connection to a fluid supply hose 44. Fluid supply hose 44 may be from an appropriate supply of hydraulic fluid under pressure, such as an air supply (not shown). As indicated, it is desirable that line 44 be permanently attached to coupling 34 and that this hose then pass to a location above the device. This will free the operator from the duty of attaching and detaching the air hose to and from the hydraulic operating mechanism. The operator is thus permitted to perform other necessary operations and the usual air hose is also free for use in putting air into the tire. However, it is possible to attain many of the advantages of the present device with the conventional detachable air hose which may be used for both putting air into the tire and operating the hydraulic mechanism. Leading from coupling 36 to one side of hydraulic cylinder 46 is hydraulic fluid supply line 48. Hydraulic fluid supply line 50 leads from coupling 38 to the opposite end of hydraulic cylinder 46. Thus, a double-acting hydraulic device is provided. It should also be recognized in this connection that the valve 32 may be a three-way valve and hydraulic cylinder 46 a single-acting cylinder. In this variation, the valve would have a neutral or closed position, a supply position and an exhaust. Fluid would be supplied to only one side of the hydraulic cylinder and the piston of the cylinder would be returned by the tension of a compressed spring mounted in the opposite end of the cylinder. Thus, when hydraulic fluid is supplied to the piston the spring will be compressed and placed under substantial tension. When it is desired to return the piston to its initial position, the hydraulic fluid supply line would be closed and the exhaust opened to exhaust hydraulic fluid from the piston cylinder. The tension or force of the spring will then return the piston to its initial position. Hydraulic cylinder 46 is fixedly attached to a generally L-shaped angle 52. Angle 52 is in turn rotatably mounted on crescent or sector 54 by appropriate bolt means or otherwise. Sector 54 serves numerous purposes in addition to the support of hydraulic cylinder 46. It serves first as a terminus for the ends of cable 12 and as a means for adjusting the cable to tires of different sizes in a preliminary adjustment. For purposes of this preliminary adjustment, sector 54 has formed therethrough apertures 56. On sector 54, opposite each of the apertures 56, one may print appropriate tire sizes thereby further facilitating and speeding up the changing operation. The device of the present invention may, of course, be made to accommodate tires of any given conventional size, for example, preliminary adjustment may be made in the present device to accommodate tires from 600–13 all the way to 950–15. Of course, it is simply a matter of putting additional holes in sector 54 in order to permit additional adjustment. In order to provide this preliminary adjustment to the approximate size of a given tire, one end of cable 12 has attached thereto a steel rod, or hook 58, which is bent downwardly and adapted to hook through apertures 26 in segment 54. It is obviously a quite simple operation to remove hook 58 from a given aperture 56 and place it in the proper aperture before the device is placed about the tire or after it has been placed about the tire. This, as indicated, permits a preliminary adjustment of the diameter of cable 12. Since sector 54 has an elongated peripheral dimension, it is necessary that at least one of these rods be attached to the segment in order to support the segment and hold it in a generally-horizontal position. This can be readily accomplished by threading one end of the rod 16 and appropriately bolting this end to sector 54 with nuts or the like. It is also possible to slideably mount the free end of rod 16 in an arcuate slot formed in sector 54. This will permit some latitude of movement in a circumferential direction in the event that tires of a very wide range of size are to be worked on and at the same time it will distribute the support rods 16 about the device more evenly. The opposing end of cable 12 is formed as a closed loop and attached to a support block 60 by means of a bolt 62 which passes through the block and loop or eyelet of the cable. Screwed into or otherwise fastened to block 60 is the free end of piston rod 64. It will be quite obvious to one skilled in the art that the end of cable 12 could just as readily be attached to piston rod 64 by other appropriate means, for example, by drilling a hole through the end of piston rod 64 and passing cable 12 therethrough and then forming the loop or eyelet as shown in the drawing. This of course will permit a greater degree of freedom and better alignment. However, any appropriate means will be contemplated and will be apparent to one skilled in the art. Before passing to support block 60, cable 12 passes through guide means 66 which is mounted on sector 54. Guide means 66 serves to direct or hold the cable 12 in a generally circumferential relationship as power is applied or released by the hydraulic mechanism. Guide means 66 is shown as a conventional eyebolt but can be any appropriate guide means. Guide means 66 is preferably rotatably mounted on sector 54. Finally, the sector 54 serves a purpose which is not immediately obvious and cannot be illustrated in the drawings. It will be observed from the drawing of FIGURE 1 that sector 54 has an internal arc which is somewhat smaller than the contemplated arcuate dimension of the tire. This is done purposely in order to distort the tire along at least a portion of its circumference so that when the bead of the tire, usually the upper bead, is pressed upwardly, this distortion at one point about the periphery will permit the bead to clear the valve butt which is inside the rim of the wheel. This valve butt, in conventional operations using conventional devices, usually gets in the way of the bead of the tire and must be cleared by wiggling or otherwise adjusting the bead as pressure is applied or the bead is simply forced past the butt of the valve. In either case, particularly where the bead is forced past the butt of the valve, damage to the valve or displacement of the valve often occurs resulting in permanent damage or a temporary leak. If, however, one side of the tire, that is the side adjacent the valve, is distorted or compressed slightly more than the remainder of the tire the bead in this area will rise in a generally outward direction and will always be above the remainder of the bead until it contacts the rim. Thus, the bead can easily clear the butt of the valve mounted in the rim.

From the above it is quite obvious that a highly efficient and effective device for mounting tubeless tires has been provided. In actual operation the operator simply pulls the device down and inserts the hook 58 in the proper aperture 56 for the tire which is to be mounted, thus, providing a preliminary adjustment to the approximate size of the tire. He then in one motion and with one hand lowers the device over the tire and manipulates the valve to permit hydraulic fluid to enter the cylinder 46 through line 48. This will tighten the cable 12 about the tire and compress the tire, thus, spreading the beads against the wheel rim. With the device suspended as described herein, the additional weight of sector 54 and hydraulic cylinder 46 is an advantage since this portion of the device will be slightly lower than the opposite side of the device, thereby, permitting one to first place the sector 54 in the proper position against the outside of the tire and then rock the remainder of the device or the back side of cable 12 over the edge of the tire. By utilizing the present device it is also possible to place the cable over the upper portion of the tire as opposed to about the middle of the tire. This is, of course, made possible by the suspension of the tire device as well as of the use of a thin cable. In any other device it is absolutely necessary that the compressing means be about the middle of the tire only. However, the present device can be placed at any point in the vertical height of the tire without danger of it slipping off or operating improperly. When the device is placed above the top portion of the tire, it permits the upper bead, which is further away from the rim than the lower bead, to be forced up while the lower bead, which requires less pressure to force it against the lower rim, has less pressure applied thereto.

While specific examples and illustrations have been set forth herein, it is to be recognized that these are by way of example only and that other variations and modifications can be made by one skilled in the art without departing from the present invention. Therefore, the present invention is to be limited only in accordance with the appended claims.

I claim:

1. A device for spreading the beads of a tubeless tire into contact with the rims of a vehicle wheel in order to mount said tire on said wheel comprising:
   (a) a generally-circular support disc having a plurality of cylindrical holes bored radially into its periphery at equally spaced points about said periphery;
   (b) a plurality of spring steel rods each having one end thereof frictionally engaged in one of said cylindrical holes and extending horizontally from said disc, thence at an acute angle downwardly from the horizontal, and thereafter vertically downwardly a distance equal to about half the breadth of said tire;
   (c) a plurality of horizontally-disposed annular sleeves mounted on the lower free ends of all except one of said rods;
   (d) a flexible, steel cable, having a degree of flexibility such that it will not be self-supporting when formed into the general configuration of a circle a length sufficient to encompass between about 180° and 270° of the circumference of said tire, passing slideably through said sleeves;
   (e) hook means mounted on the top of said support disc whereby said support disc and its appurtenant elements may be suspended in an elevated position;
   (f) a four-way air valve mounted on the top of said support disc and having a fluid inlet coupling, two fluid outlet couplings and a fluid exhaust means operatively associated with each of said outlet couplings;
   (g) an arcuate, flat, horizontally-disposed sector having an inner radius slightly smaller than the radius of said tire;
   (h) means for fixedly attaching the free end of said one radial rod to said sector adjacent the center of said sector;
   (i) a hydraulic cylinder having an air-operable piston slideably mounted therein and a piston rod attached to said piston and passing through one end of said cylinder;
   (j) pivot means fixedly attached to one end of said cylinder and pivotally attached to said sector adjacent the center, outer edge thereof to pivotally support said cylinder on said sector;
   (k) sleeve-type means mounted on the end of said sector adjacent the free end of said piston rod and adapted to receive one end of said cable;
   (l) coupling means adapted to couple said one end of said cable to said free end of said piston rod, whereby said one end of said cable will be moved back and forth through said guide means as said piston rod is moved back and forth;

(m) air line means connected between one of said outlet couplings of said valve and the interior of said cylinder adjacent one side of said piston;

(n) air line means connected to the other of said fluid outlets of said valve and the interior of said cylinder adjacent the other side of said piston; and (o) L-shaped hook means attached to the other end of said cable with its free end oriented downwardly;

(p) said sector having a plurality of holes bored therethrough along an arcuate line adjacent the end of said sector opposite the free end of said piston rod and adapted to receive the downwardly projecting end of said L-shaped hook and permit adjustment of the circumference of the circle formed by said sector and said cable.

2. A device for mounting a tire on a vehicle wheel, comprising:

(a) a generally, horizontally-disposed sector defining an arc of less than about 180°;

(b) a compression element attached to said sector;

(c) a flexible cable having one end thereof attached to said compression element and its opposite end coupled to said sector;

(d) said cable having a length sufficient to complete a circle of a circumference larger than the circumference of said tire when in combination with said sector; and (e) support means including a plurality of radially disposed elements joined at their center and curved downwardly to form a generally dome-shaped structure with the lower ends thereof attached to said cable and adapted to hold said cable and said sector in a generally circular form when said sector and said cable are disposed in a generally horizontal plane;

(f) said compression element being adapted to apply tension to said cable whereby the circumference of the circle formed by said sector and said cable is reduced in size and at least a portion of the tire is compressed thereby.

3. A device in accordance with claim 2 wherein the radially disposed elements are spring steel rods.

4. A device in accordance with claim 2 wherein the radially disposed elements slideably support the cable.

5. A device in accordance with claim 2 wherein at least one of the radially disposed elements is fixedly attached to the sector to maintain the same in a generally horizontal position.

6. A device in accordance with claim 2 wherein the support means has means adapted to receive a suspending cable.

7. A device in accordance with claim 2 wherein the compression element is a hydraulically-operated piston and a valve means for admitting fluid to and discharging fluid from said piston is mounted adjacent the means adapted to receive a suspending cable.

8. A device in accordance with claim 2 wherein hook means are formed on the end of the cable which is coupled to the sector and the sector has a plurality of holes along an arcuate line adjacent one end of said sector adapted to receive said hook means.

References Cited

UNITED STATES PATENTS

| 2,791,270 | 5/1957 | Hildebrant | 157—1.21 |
| 2,871,929 | 2/1959 | Butler et al. | 157—1.21 |
| 2,998,055 | 8/1961 | McConkie | 157—1.21 |
| 3,039,518 | 6/1962 | Neilson | 157—1.21 |
| 3,241,593 | 3/1966 | Lien | 157—1.21 |

FOREIGN PATENTS 768,868   2/1957   Great Britain.

GRANVILLE Y. CUSTER, Jr., *Primary Examiner.*